(12) United States Patent
Kumar

(10) Patent No.: US 9,294,354 B2
(45) Date of Patent: Mar. 22, 2016

(54) USING MULTIPLE TRAFFIC PROFILES TO DESIGN A NETWORK ON CHIP

(71) Applicant: NETSPEED SYSTEMS, San Jose, CA (US)

(72) Inventor: Sailesh Kumar, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 216 days.

(21) Appl. No.: 14/062,618

(22) Filed: Oct. 24, 2013

(65) Prior Publication Data

US 2015/0117261 A1    Apr. 30, 2015

(51) Int. Cl.
*H04L 12/24* (2006.01)
*G06F 11/00* (2006.01)
*G06F 13/14* (2006.01)
*G06F 17/50* (2006.01)
*G06F 15/78* (2006.01)

(52) U.S. Cl.
CPC .......... *H04L 41/083* (2013.01); *G06F 15/7807* (2013.01); *G06F 15/7825* (2013.01); *G06F 17/5068* (2013.01); *G06F 17/5077* (2013.01); *H04L 41/0806* (2013.01); *H04L 41/145* (2013.01)

(58) Field of Classification Search
CPC .............................. H04L 41/12; H04L 41/14
See application file for complete search history.

(56) References Cited

U.S. PATENT DOCUMENTS

| | | | |
|---|---|---|---|
| 5,432,785 A | 7/1995 | Ahmed et al. | |
| 5,764,740 A | 6/1998 | Holender | |
| 5,991,308 A | 11/1999 | Fuhrmann et al. | |
| 6,003,029 A | 12/1999 | Agrawal et al. | |
| 6,249,902 B1 | 6/2001 | Igusa et al. | |
| 6,415,282 B1 | 7/2002 | Mukherjea et al. | |
| 6,456,961 B1 * | 9/2002 | Patil et al. | ........................ 703/14 |
| 6,925,627 B1 | 8/2005 | Longway et al. | |
| 7,065,730 B2 | 6/2006 | Alpert et al. | |
| 7,155,554 B2 * | 12/2006 | Vinogradov | ........ G06F 13/4022 370/352 |
| 7,318,214 B1 | 1/2008 | Prasad et al. | |
| 7,570,651 B2 * | 8/2009 | Haghighi | .............. H04L 49/254 370/252 |
| 7,590,959 B2 | 9/2009 | Tanaka | |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

Sethuraman et al., OptiMap: A Tool for Automated Generation of NoC Architecture Using Multi-Port Routers for FPGAs, IEEE, pp. 1-6 (2006).*

(Continued)

*Primary Examiner* — Alpus H Hsu
(74) *Attorney, Agent, or Firm* — Procopio Cory Hargreaves & Savitch LLP

(57) ABSTRACT

The present application is directed to designing an efficient Network on Chip (NoC) interconnect architecture that is adaptable to varied interface protocols of different SoC components/hosts and is compliant to handle different types and models of traffic profiles. Aspects of the present application include a method, which may involve utilizing multiple traffic profiles described in a specification to generate a NoC that satisfies all the traffic profiles. Such a NoC interconnect architecture can be formed from multiple traffic profiles by generating a single consolidated traffic profile from individual or subset based dependency graphs of the multiple traffic profiles.

12 Claims, 12 Drawing Sheets

(56) References Cited

U.S. PATENT DOCUMENTS

| | | | |
|---|---|---|---|
| 7,626,983 B2 * | 12/2009 | Rhee | 370/386 |
| 7,725,859 B1 | 5/2010 | Lenahan et al. | |
| 7,808,968 B1 | 10/2010 | Kalmanek, Jr. et al. | |
| 7,917,885 B2 | 3/2011 | Becker | |
| 8,050,256 B1 | 11/2011 | Bao et al. | |
| 8,059,551 B2 | 11/2011 | Milliken | |
| 8,099,757 B2 | 1/2012 | Riedl et al. | |
| 8,136,071 B2 | 3/2012 | Solomon | |
| 8,151,088 B1 * | 4/2012 | Bao et al. | 712/11 |
| 8,281,297 B2 | 10/2012 | Dasu et al. | |
| 8,312,402 B1 | 11/2012 | Okhmatovski et al. | |
| 8,316,171 B2 * | 11/2012 | Boucard et al. | 710/241 |
| 8,448,102 B2 | 5/2013 | Kornachuk et al. | |
| 8,492,886 B2 | 7/2013 | Or-Bach et al. | |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,635,577 B2 | 1/2014 | Kazda et al. | |
| 8,667,439 B1 | 3/2014 | Kumar et al. | |
| 8,713,234 B2 * | 4/2014 | Lakshmanamurthy | G06F 13/362 710/113 |
| 8,717,875 B2 | 5/2014 | Bejerano et al. | |
| 8,885,510 B2 * | 11/2014 | Kumar | H04L 49/109 370/252 |
| 9,009,648 B2 * | 4/2015 | Kumar | H04L 47/12 716/138 |
| 9,185,023 B2 * | 11/2015 | Norige | H04L 45/06 |
| 2002/0071392 A1 | 6/2002 | Grover et al. | |
| 2002/0073380 A1 | 6/2002 | Cooke et al. | |
| 2002/0095430 A1 | 7/2002 | Egilsson et al. | |
| 2004/0216072 A1 | 10/2004 | Alpert et al. | |
| 2005/0147081 A1 | 7/2005 | Acharya et al. | |
| 2006/0161875 A1 | 7/2006 | Rhee | |
| 2007/0118320 A1 | 5/2007 | Luo et al. | |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2008/0072182 A1 | 3/2008 | He et al. | |
| 2008/0120129 A1 | 5/2008 | Seubert et al. | |
| 2009/0070726 A1 | 3/2009 | Mehrotra et al. | |
| 2009/0268677 A1 | 10/2009 | Chou et al. | |
| 2009/0313592 A1 | 12/2009 | Murali et al. | |
| 2010/0040162 A1 | 2/2010 | Suehiro | |
| 2010/0161793 A1 * | 6/2010 | Young Hwan et al. | 709/224 |
| 2011/0035523 A1 | 2/2011 | Feero et al. | |
| 2011/0060831 A1 | 3/2011 | Ishii et al. | |
| 2011/0072407 A1 | 3/2011 | Keinert et al. | |
| 2011/0149735 A1 * | 6/2011 | Mangano et al. | 370/235 |
| 2011/0154282 A1 | 6/2011 | Chang et al. | |
| 2011/0191088 A1 * | 8/2011 | Hsu et al. | 703/13 |
| 2011/0276937 A1 | 11/2011 | Waller | |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0110541 A1 | 5/2012 | Ge et al. | |
| 2012/0155250 A1 | 6/2012 | Carney et al. | |
| 2013/0051397 A1 | 2/2013 | Guo et al. | |
| 2013/0080073 A1 | 3/2013 | de Corral | |
| 2013/0103369 A1 | 4/2013 | Huynh et al. | |
| 2013/0151215 A1 | 6/2013 | Mustapha | |
| 2013/0159944 A1 | 6/2013 | Uno et al. | |
| 2013/0174113 A1 | 7/2013 | Lecler et al. | |
| 2013/0179613 A1 * | 7/2013 | Boucard et al. | 710/113 |
| 2013/0191572 A1 * | 7/2013 | Nooney et al. | 710/110 |
| 2013/0207801 A1 | 8/2013 | Barnes | |
| 2013/0219148 A1 | 8/2013 | Chen et al. | |
| 2013/0263068 A1 | 10/2013 | Cho et al. | |
| 2013/0326458 A1 | 12/2013 | Kazda et al. | |
| 2014/0068132 A1 | 3/2014 | Philip et al. | |
| 2014/0082237 A1 * | 3/2014 | Wertheimer | G06F 13/14 710/104 |
| 2014/0092740 A1 * | 4/2014 | Wang | H04L 45/06 370/235 |
| 2014/0098683 A1 | 4/2014 | Kumar et al. | |
| 2014/0115218 A1 | 4/2014 | Philip et al. | |
| 2014/0115298 A1 | 4/2014 | Philip et al. | |
| 2014/0254388 A1 * | 9/2014 | Kumar | H04L 47/2425 370/238 |

OTHER PUBLICATIONS

Benini et al., "Networks on Chips: A New SoC Paradigm", IEEE Computers, pp. 70-78 (2002).*

Abts, D., et al., Age-Based Packet Arbitration in Large-Radix k-ary n-cubes, Supercomputing 2007 (SC07), Nov. 10-16, 2007, 11 pgs.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

Related Art

Related Art

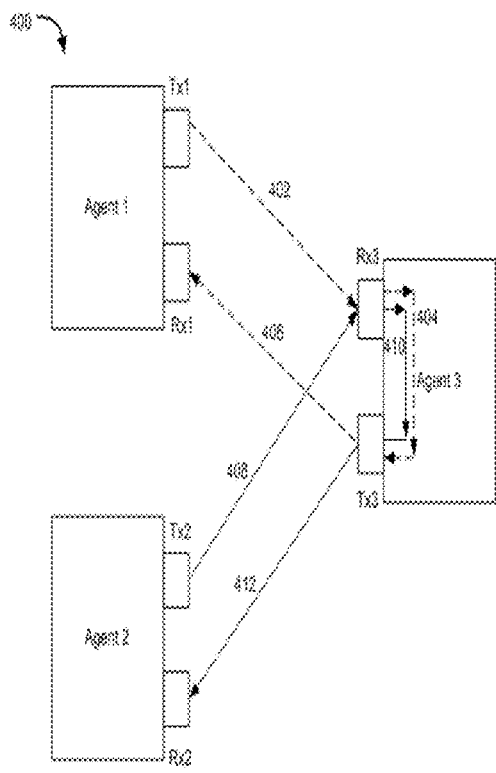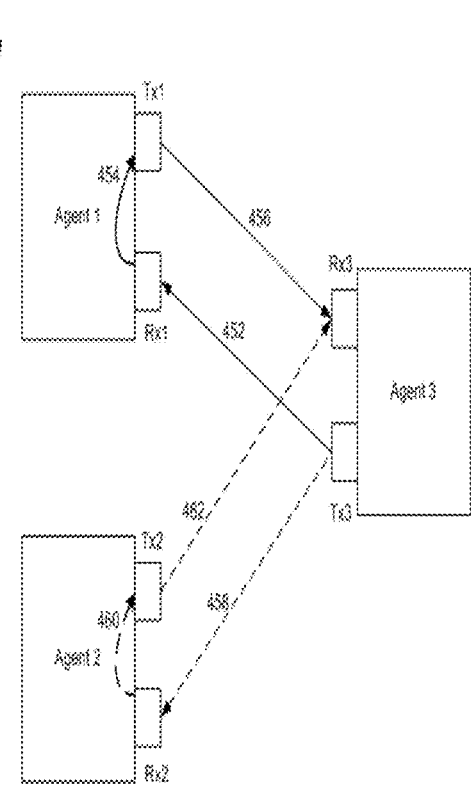
FIG. 4(a)
Related Art
FIG. 4(b)
Related Art

USING MULTIPLE TRAFFIC PROFILES TO DESIGN A NETWORK ON CHIP

BACKGROUND

1. Technical Field

Methods and example implementations described herein are directed to interconnect architecture, and more specifically, generating a Network on Chip (NoC) from multiple traffic profiles.

2. Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel. The NoC interconnect is generated from a specification by utilizing design tolls. The specification can contain constraints such as bandwidth/QoS/latency attributes that is to be met by the NoC, and can be in various software formats depending on the design tolls utilized. Once the NoC is generated through use of design tolls on the specification to meet the specification requirements, the physical architecture can be implemented either by manufacturing a chip layout to facilitate the NoC or by generation of a register level (RTL) for execution on a chip to emulate the generated NoC, depending on the desired implementation.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is certain amount of heterogeneity (e.g., certain hosts talk to each other more frequently than the others), the interconnect performance may depend a lot on the NoC topology and where various hosts are placed in the topology with respect to each other and to what routers they are connected to. For example, if two hosts talk to each other frequently and need higher bandwidth, they should be placed next to each other. This will reduce the latency for this communication, and thereby reduce the global average latency, as well as reduce the number of router nodes and links over which the high bandwidth of this communication must be provisioned. Moving two hosts close by may make certain other hosts far apart since all hosts must fit into the 2D planar NoC topology without overlapping with each other. Thus, right tradeoffs must be made and the hosts must be placed after examining the pair-wise bandwidth and latency requirements between all hosts so that certain global cost and performance metrics is optimized. The cost and performance metrics can include the average structural latency between all communicating hosts in number of router hops, or the sum of the bandwidth between all pair of hosts and the distance between them in number of hops, or some combination thereof. This optimization problem is known to be non-deterministic polynomial-time hard (NP-hard) and heuristic based approaches are often used. The hosts in a system may vary is shape and sizes with respect to each other which puts additional complexity in placing them in a 2D planar NoC topology, packing them optimally leaving little whitespaces, and avoiding overlapping hosts.

The traffic profile may include a description of the SoC IP cores and the connectivity, as well as bandwidth, latency and Quality of Service (QoS) requirements. In the related art, single traffic profiles are used by system designers to formulate a NoC. However, when a NoC is required to service multiple different traffic profiles, there is an increased complexity for system designers to determine the parameters and topology of a NoC that satisfies the requirements of all of the multiple different traffic profiles.

There is also additional complexity when there are subsets of traffic profiles that can or cannot co-exist with each other (i.e., capable of simultaneous execution within the same time window), which may be difficult for system designers to resolve. For example, assume there are three SoC agents A1, A2 and A3, each of which has a transmitter (Tx) and a receiver (Rx) as illustrated in the dependency graphs FIGS. 4(a) and 4(b). For a first traffic profile 400 as shown in FIG. 4(a), Tx of A1 transmits to Rx of A3 through 402, which cycles back to Tx of A3 through 404, which transmits to Rx of A1 through 406, with 402→404→406 forming first part of the dependency graph for the above mentioned traffic profile. In the same traffic profile of FIG. 4(a), Tx of A2 transmits to Rx of A3 through 408, which cycles back to Tx of A3 through 404, which transmits to Rx of A2 through 412, with 408→404→412 forming second part of the dependency graph for the above mentioned traffic profile. The arrows show dependency edges of traffic profile, say TP1.

For a second traffic profile 450 as illustrated in FIG. 4(b), Tx of A3 transmits to Rx of A1 and A2 through 452 and 458 respectively, which cycle (through 454 and 460 respectively) and transmit to Rx of A3 from their respective Tx through 456 and 462 respectively forming dependency graph as shown in FIG. 4(b) with the arrows showing dependency edges of traffic profile, say TP2. The two traffic profiles 400 and 450 may be interpreted by a system designer as creating a protocol level deadlock when implemented together. However, in the examples of FIGS. 4(a) and 4(b), the protocol level deadlocks would not occur as the two traffic profiles do not co-exist in the same time window.

SUMMARY

The present application is directed to designing an efficient Network on Chip (NoC) interconnect architecture that is adaptable to varied interface protocols of different SoC components/hosts and is compliant to handle different types and models of traffic profiles. Aspects of the present application include a method, which may involve utilizing multiple traffic profiles described in a specification to generate a NoC that satisfies all the traffic profiles. Such a NoC interconnect architecture can be formed from multiple traffic profiles by generating a single consolidated traffic profile from individual or subset based dependency graphs of the multiple traffic profiles. In an example implementation, one or more subsets of traffic profiles can be created such that each subset can co-exist with any other subset having traffic profiles. Each such created subset can then be implemented on a separate Tx and Rx interface node for one or more agents, which ensures that the subsets are simultaneously active and do not form a deadlock situation.

Aspects of the present application may include a method, which involves, generating a network on chip (NoC) interconnect from a specification that includes a plurality of traffic profiles and requirement information such as bandwidth requirement, latency requirement, and Quality of Service (QoS) requirement for each of the plurality of traffic profiles. NoC interconnect architecture may be generated from the specification based on a deadlock avoidance process (by creation of a single dependency graph as mentioned above) and a topology design process. In an aspect of the application, topology design process can configured to determine bandwidth requirement for each flow of the final single traffic profile (using the single dependency graph) based on a sum of bandwidth requirements of flows in a subset of the traffic profiles that co-exist during a same time window, and perform one or a combination of link sizing, virtual channel allocation, and determination of NoC topology, and routes and number of NoC layers for the final single traffic profile based on determined bandwidth requirement for each flow of the traffic profile. On similar lines, topology design process can further be configured to determine latency requirement for each flow of the final single traffic profile based on a minimum latency requirement of flows in a subset of traffic profiles that co-exist during a same time window. In yet another aspect, topology design process can further be configured to consolidate QoS requirements for each flow for the final single traffic profile from the flows of individual traffic profiles.

Aspect of present application may include a computer readable storage medium storing instructions for executing a process. The instructions may involve, generation of a NoC interconnect architecture from multiple traffic profiles, categorized as one or more subsets that can co-exist together at any given time, by generating a single consolidated traffic profile from individual or subset based dependency graphs of the multiple traffic profiles. Each generated subset having traffic profiles can be configured on a separate Tx and/or Rx interface node, enabling a structure and configuration where all subsets can co-exist.

Aspects of present application may include a method, which involves, for a network on chip (NoC) configuration, including a plurality of cores interconnected by a plurality of routers in a heterogenous or heterogenous mesh, ring, or torus arrangement, generating a NoC interconnect architecture from multiple traffic profiles, categorized as one or more subsets that can co-exist at any given time, by deriving a single consolidated traffic profile from individual or subset based dependency graphs of the multiple traffic profiles.

Aspects of the present application may include a system, which involves, a subset identification module, a dependency graph derivation module, and a single dependency graph generation module, wherein the subset identification module can be configured to identify a plurality of subsets of traffic profiles such that each subset of traffic profiles can co-exist with other subsets of traffic profiles. Dependency graph derivation module can be configured to process a given subset having one or more traffic profiles and generate a dependency graph for the respective subset such that dependent edges of traffic profiles in the processed subset, for any given or a combination of subsets, are added to form a dependency graph for the given subset of traffic profile(s). Dependency graph derivation module can further be configured to iterate the process of dependency graph generation until all subsets are processed so as to yield a plurality of dependency graphs based on the number of subsets. Single dependency graph generation module can be configured to form a single dependency graph from all of the processed subsets and their respective dependency graphs. Such a single dependency graph for all subsets can then be analyzed for network and protocol level deadlocks.

BRIEF DESCRIPTION OF THE DRAWINGS

FIGS. 4(a) and 4(b) illustrate examples of dependency graphs.

DETAILED DESCRIPTION

Figure 1A:
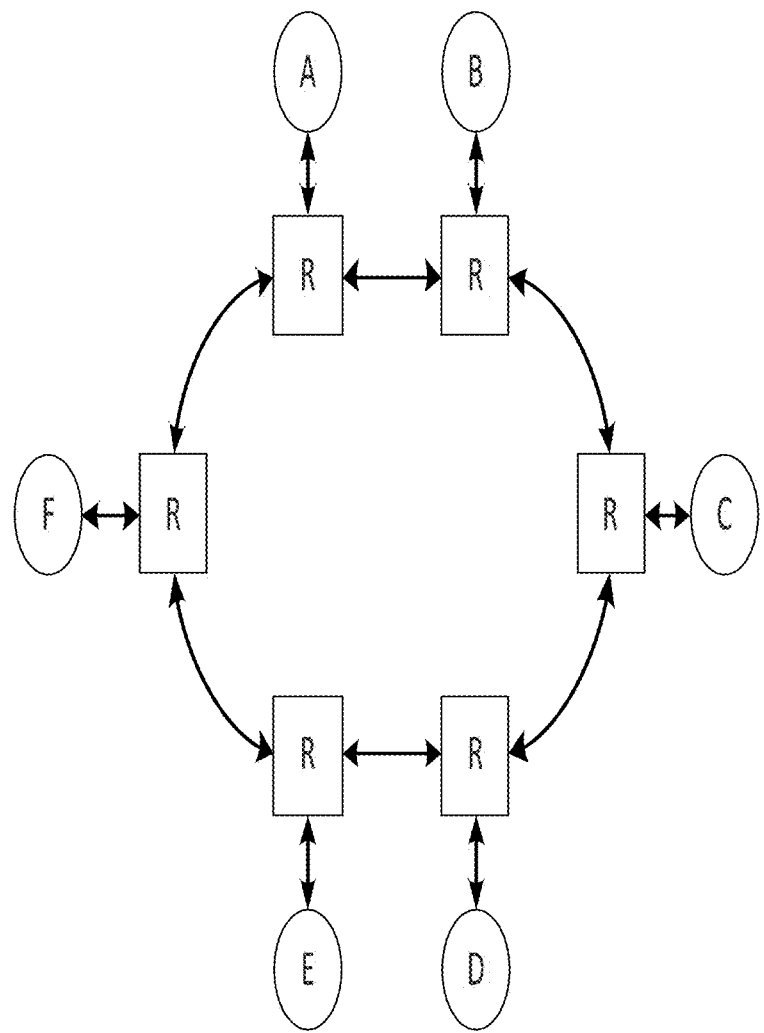
FIGS. 1(a), 1(b) 1(c) and 1(d) illustrate examples of Bidirectional ring, 2D Mesh, 2D Torus, and 3D Mesh NoC Topologies.
Figure 1B:
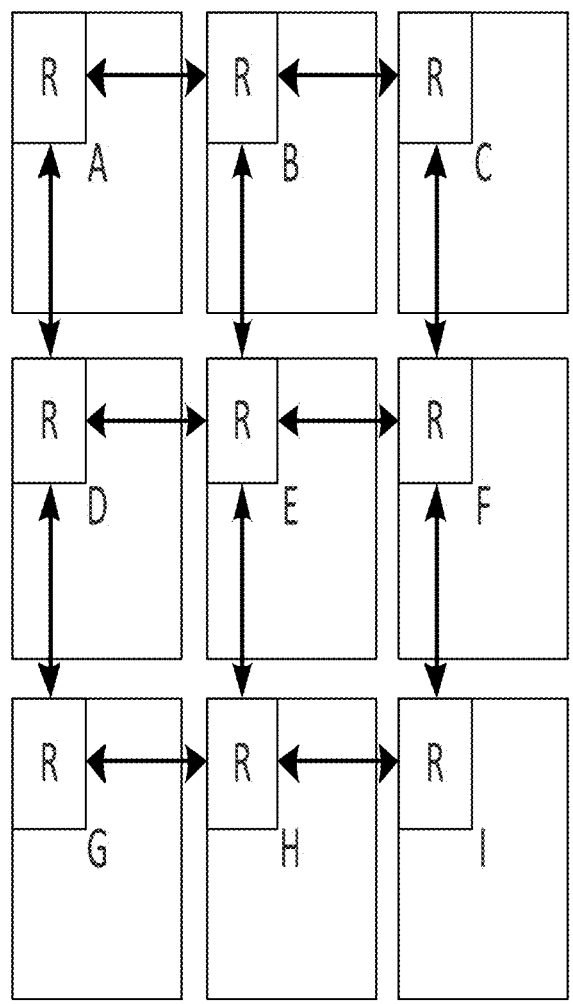
Figure 1C:
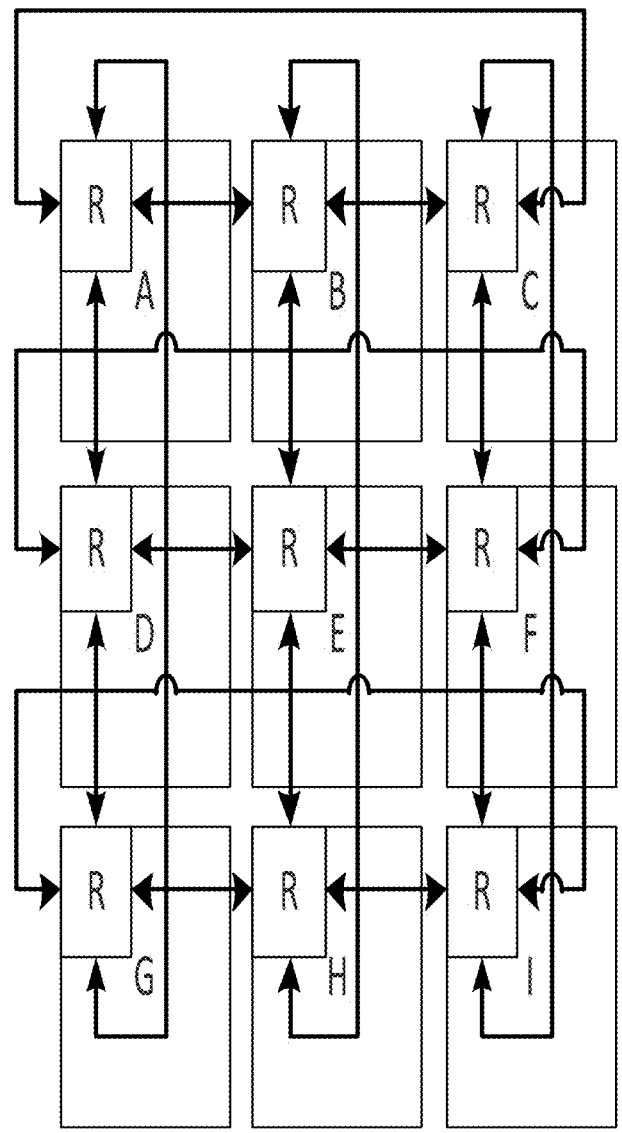
Figure 1D:
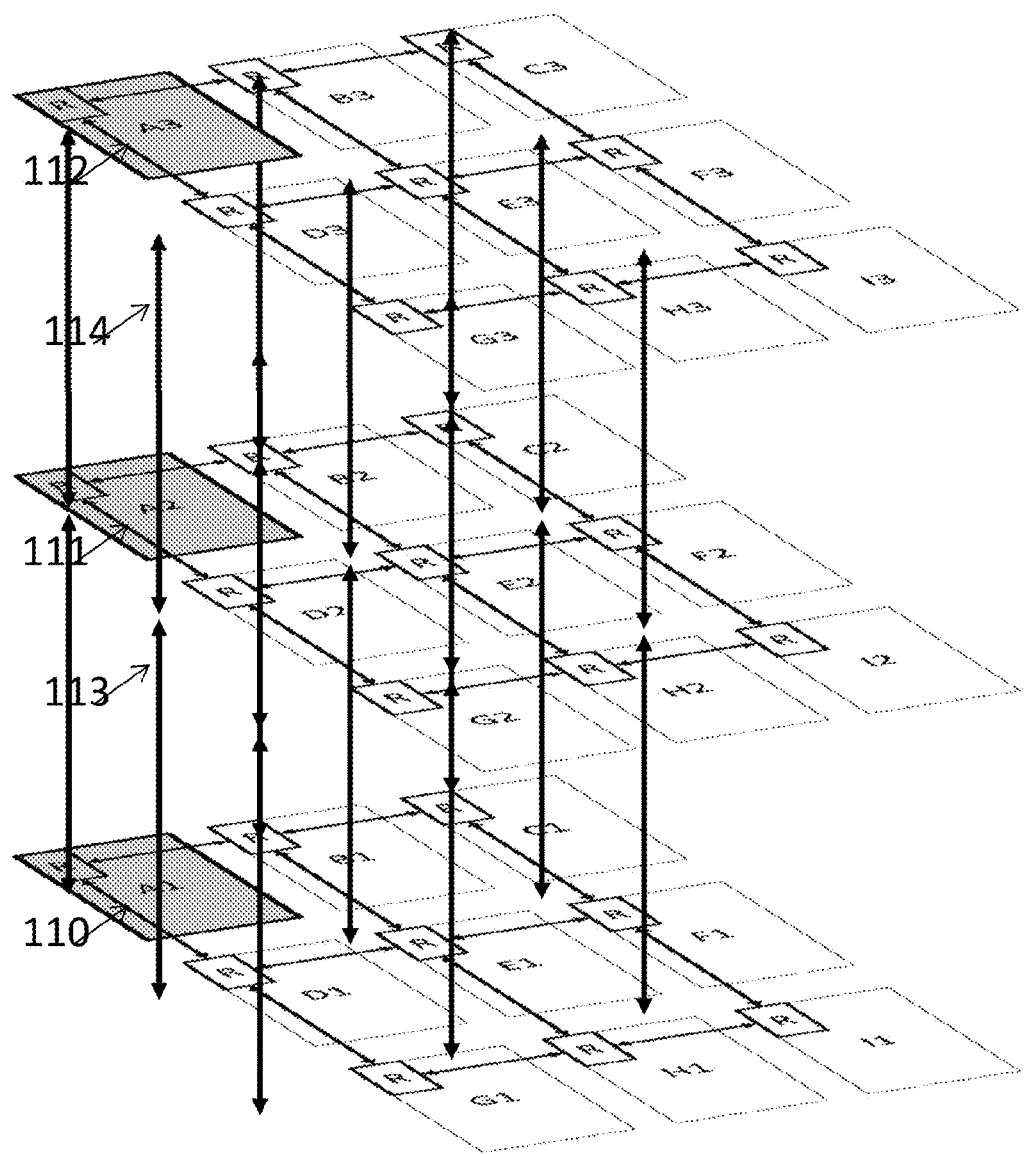
Figure 2A:
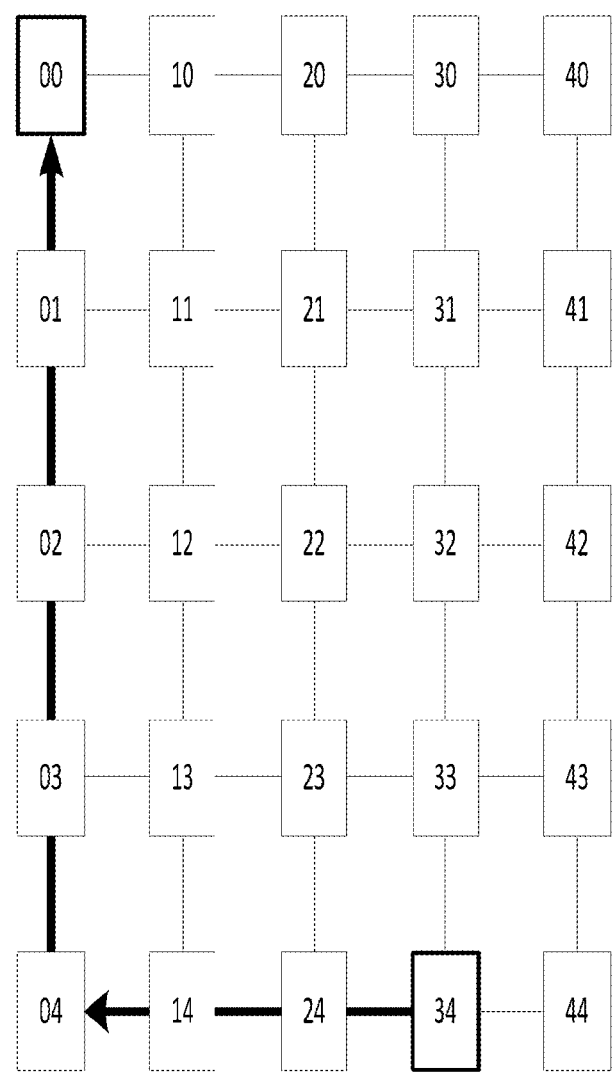
FIG. 2(a) illustrates an example of XY routing in a related art two dimensional mesh.
Figure 2B:
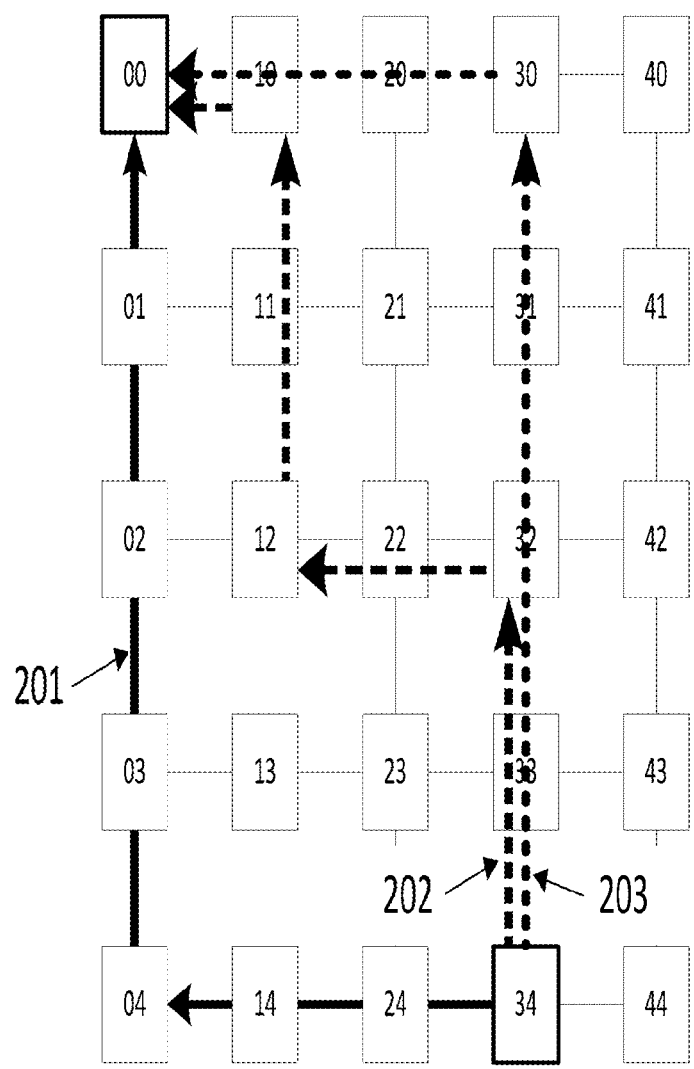
FIG. 2(b) illustrates three different routes between a source and destination nodes.
Figure 3A:
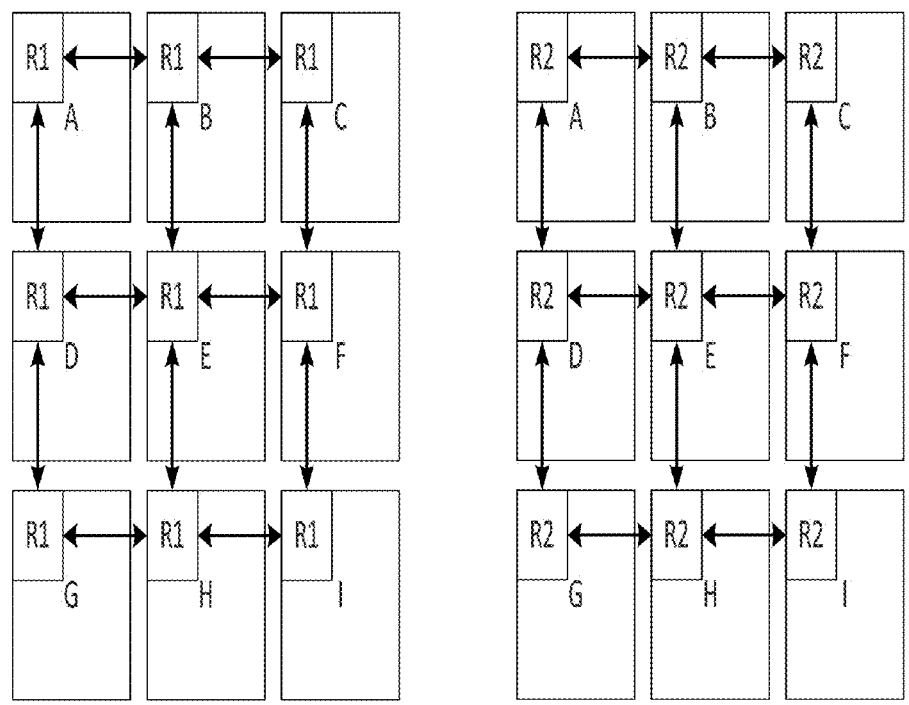
FIG. 3(a) illustrates an example of a related art two layer NoC interconnect.
Figure 3B:
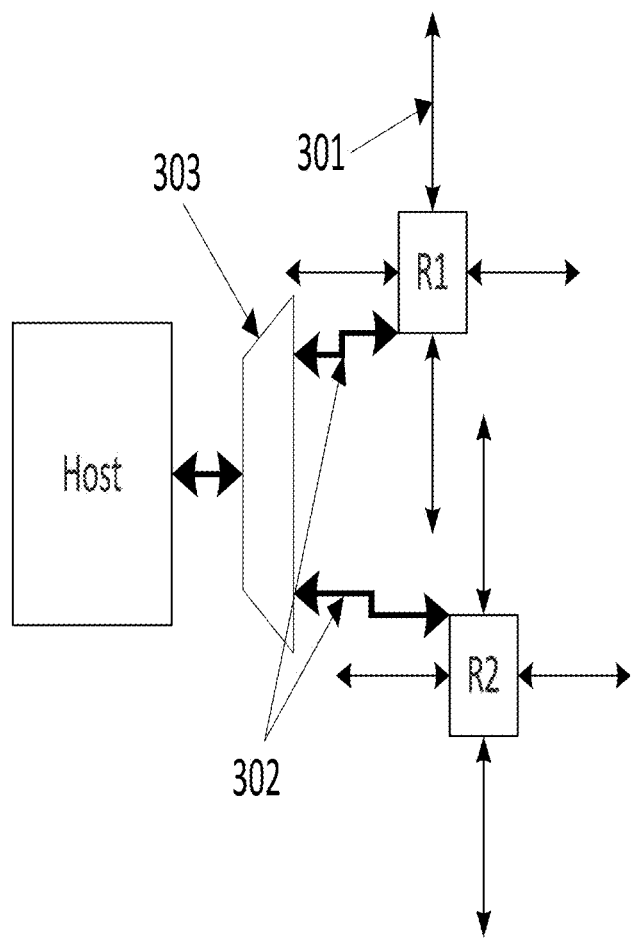
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In example implementations, a NoC can be automatically generated from a specification involving multiple traffic profiles, such that the generated NoC satisfies each of the traffic profiles. Each of the traffic profiles can contain requirement information that is indicative of one or more requirements for the NoC. Such requirements can include a bandwidth requirement, a latency requirement, a Quality of Service (QoS) requirement, protocol and dependency requirements between various messages, clock frequency requirements of SoC agents, and power domain and power sequence requirements of the SoC agents. The specification can further include subset information that indicates subsets of the traffic profiles that can be active (i.e., co-exist) in the same time window. The subset information may further indicate traffic profiles that do not co-exist in the same time window with any other traffic profile, depending on the desired implementation.

Example implementations described herein can involve generating a single traffic profile from a consolidation of the plurality of traffic profiles. The consolidation and generation of the single traffic profile can be based on a deadlock avoidance process and a topology design process as further described below. When a single traffic profile is generated, the NoC can automatically be generated based on implementations known in the art, such as the one described in U.S. application Ser. No. 13/959,541, U.S. application Ser. No. 13/745,684, and U.S. application Ser. No. 13/599,559, for each of which the contents of which is separately and independently herein incorporated by reference in its entirety for all purposes.

Figure 5A:
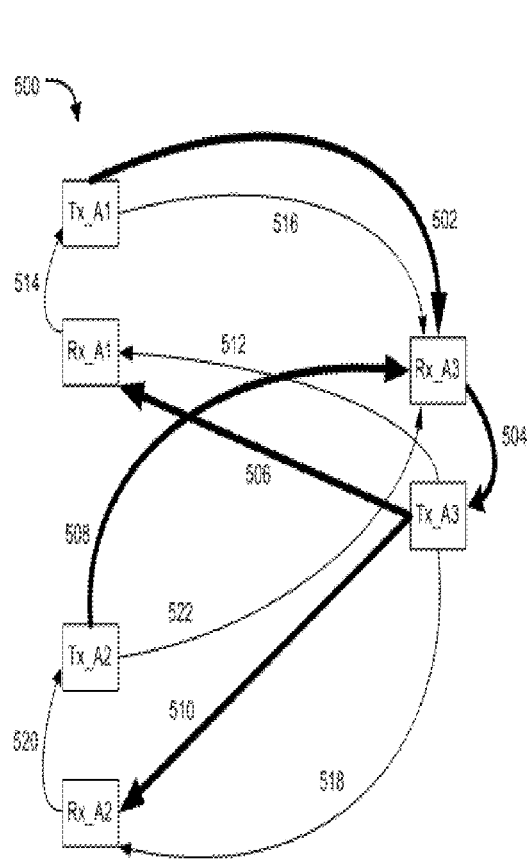
FIGS. 5(a) and 5(b) illustrate an example consolidation of dependency graphs of FIG. 4(a) and FIG. 4(b) and generation of subsets in accordance with an example implementation.
Figure 5B:
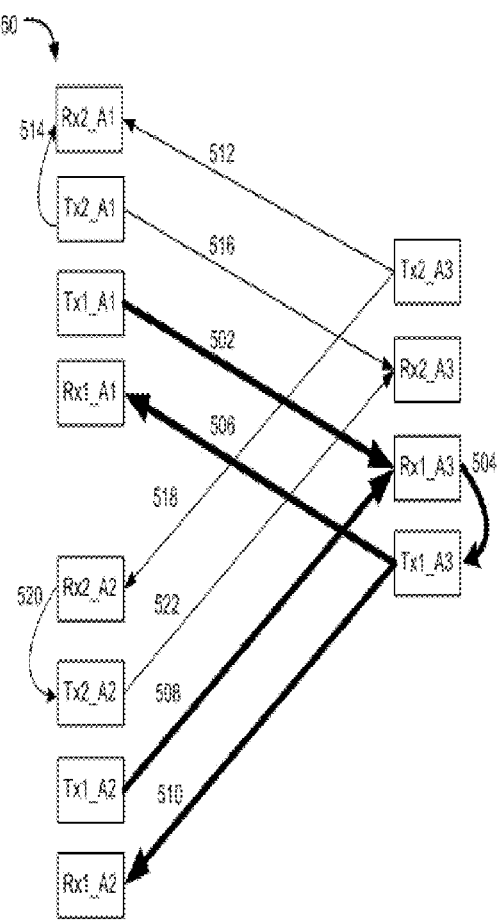

FIG. 5(a) and FIG. 5(b) illustrate an example consolidation of dependency graphs of FIG. 4(a) and FIG. 4(b) and formation of subsets in accordance with an example implementation. In a deadlock avoidance process involving multiple traffic profiles, a single dependency graph can be generated based on dependency graphs of traffic profiles of the specification. In the example illustrated in FIG. 5(a), dependency graphs of traffic profiles TP1 and TP2 have been combined to showcase a consolidated dependency graph. FIG. 5(a) shows a single dependency graph for both traffic profiles TP1 and TP2 by combining/merging dependency graphs for individual traffic profiles. Transactions 502→504→506 and 508→504→510 show the first traffic profile TP1 (shown in Bold Line), and transactions 512→514→516 and 518→520→522 show the second traffic profile TP2 (shown in normal line). As the combination of dependency graphs for both traffic profiles, as can be seen in FIG. 5, generates a cycle, there may be a deadlock position in case both the traffic profiles co-exist based on the specification.

To construct a NoC interconnect architecture that is deadlock free, traffic profiles can be divided into one or more subsets such that each subset (including traffic profiles therein) can co-exist with the other subset, which thereby permits all subsets to be active at the same time. Such subsets can be implemented in the NoC interconnect by means of an increase in the number of Tx and Rx interface nodes. In the example implementation of FIG. 5(b), two subsets can be created, with each subset corresponding to one traffic profile, say first subset S1 includes TP1 and second subset S2 includes TP2. As both the subsets include traffic profiles that can co-exist based on the specification, they can be executed together. FIG. 5(b) illustrates an increase in the number of Tx and Rx interface nodes for each agent/SoC component/host by a factor of 2 that enables two subsets with TP1 being shown in thick/bold lines and TP2 being shown in thin lines. As can be seen, Agent 1 ("A1") has two Tx interfaces, Tx1_A1 and Tx2_A1 and two Rx interfaces, Rx1_A1 and Rx2_A1. Similarly, Agent 2 "A2" also has two Tx interfaces, Tx1_A2 and Tx2_A2 and two Rx interfaces, Rx1_A2 and Rx2_A2 Likewise, Agent 3 "A3" also has two Tx interfaces, Tx1_A3 and Tx2_A3 and two Rx interfaces, Rx1_A3 and Rx2_A3. Two Tx and Rx nodes for each host/agent A1, A2, and A3, can therefore enable both the subsets S1 (formed by bold/thick lines) and S2 (formed by thin lines) to be active simultaneously.

In another aspect, generalizing the above example of FIG. 5, all traffic profiles can first be categorized into one or more subsets (S1, S2, . . . , Sn) based on the specification such that one or more subsets can remain active together. The number of Tx and Rx interface nodes for each agent can then be increased or multiplied based on the number subsets, wherein, for example, in case there are 4 subsets, the number of Tx interface nodes can be increased to 4 for each agent. Such increase in the number of nodes and implementation of each subset on a node enables a cycle/deadlock free NoC interconnect architecture. Once it has been ensured that the traffic profile subsets have been implemented on different Tx and Rx interface nodes of agents, the final dependency graph can be used to perform network level mapping of traffic flows to create the NoC architecture.

In one aspect of the present application, a network on chip (NoC) interconnect architecture can be generated from a specification, where the specification includes a plurality of traffic profiles having different characteristics, parameters, bandwidth/QoS/latency attributes, and requirement information. Generated NoC can be configured so as to satisfy one or more requirements indicated in the requirement information specified by each of the plurality of traffic profiles in the specification. According to an example implementation of the present application, specification of a plurality of traffic profiles can include clock frequency information and power domain information for each of the plurality of traffic profiles. Requirement information can either be specified by each traffic profile or collectively by a subset of traffic profiles, wherein the requirement can include one or more traffic profile attributes and parameters such as bandwidth requirement, latency requirement, and Quality of Service (QoS) requirement. Requirement information can further include protocol and dependency requirements between various messages, clock frequency requirements of SoC agents, and power domain and power sequence requirements of SoC agents.

In an aspect of the present application, NoC interconnect architecture can include multiple traffic profiles that have their attributes specified in a specification, wherein the specification can include subset information indicative of one or more subsets of a plurality of traffic profiles that can co-exist during a same time window. In an example, traffic profiles can be categorized into one or more subsets such that profiles of a first subset do not overlap or cause a conflict/deadlock when executed along with profiles of a second subset at any given time instant. Based on such subsets of traffic profiles, NoC interconnect architecture can be formed from the specification, either automatically or manually, based on a deadlock avoidance process and a topology design process.

According to one implementation, a dependency graph can be generated for each subset having one or more traffic profiles based on flow that each traffic profile specifies. One or more dependency graphs of subsets of traffic profiles can then be combined to form a single dependency graph, which can help construct a deadlock/congestion free NoC interconnect architecture. Such a single dependency graph can be configured to ensure that all dependencies within one or more subsets of the plurality of traffic profiles that can co-exist during a same time window. It is to be appreciated that each subset can relate to a single traffic profile and dependency graph can initially be created for each traffic profile and then all or part of the created dependency graphs can be processed to generate a single dependency graph, based on which the NoC interconnect can be processed. In another aspect, topology design process of the present disclosure can further be configured to generate a single traffic profile (by a single dependency graph) from the plurality of traffic profiles.

According to one embodiment, NoC interconnect architecture can be generated from the specification based on a deadlock avoidance process (by creation of a single dependency graph as mentioned above) and a topology design process. In an aspect of the application, topology design process can be configured to determine bandwidth requirement for each flow of the final single traffic profile (using the single dependency graph) based on a sum of bandwidth requirements of flows in a subset of the traffic profiles that co-exist during a same time window, and perform one or a combination of link sizing, virtual channel allocation, and determination of NoC topology, and routes and number of NoC layers, for the final single traffic profile based on determined bandwidth requirement for each flow of the traffic profile.

In another aspect of the application, topology design process can further be configured to determine latency requirement for each flow of the final single traffic profile based on a minimum latency requirement of flows in a subset of traffic profiles that co-exist during a same time window. In yet another aspect, topology design process can further be configured to consolidate QoS requirements for each flow for the final single traffic profile from the flows of individual traffic profiles. An example flow for the deadlock avoidance process is illustrated in FIG. 6 as described below.

Figure 6:
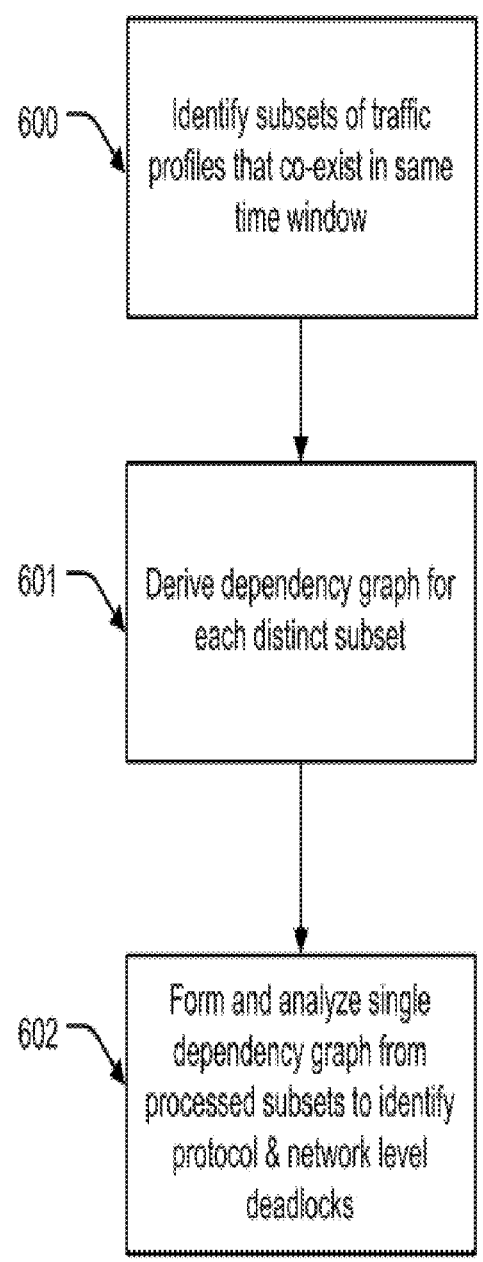
FIG. 6 illustrates a flow diagram showing a deadlock avoidance process in accordance with an example implementation.

FIG. 6 illustrates an example flow diagram for the deadlock avoidance process, in accordance with an example implementation. The flow begins at 600, wherein subsets of traffic profiles that can co-exist in the same time window are identified. Such traffic profiles, in an example embodiment, can be derived from subset information of the specification that provides an indication of the subsets of traffic profiles, or can be derived by other methods depending on desired implementation. Each subset can either be generated automatically based on a defined set of traffic profile parameters or can be modified/built manually such that traffic profiles in each subset can be active and running along with traffic profiles of any other subset. At 601, a dependency graph can be derived for each distinct subset of traffic profiles from 600. The dependent edges of the traffic profiles for the subset can be added to the respective dependency graph of the subset. Flow at 601 can be iterated until all subsets are processed. At 602, a single dependency graph can be formed from dependency graphs of one or more processed subsets, where the single dependency graph can then be analyzed for network and protocol level deadlocks. The flow at 602 can be based on protocol and dependency requirements between various messages, and can be performed by implementations known in the art.

The topology design process for generating the network on chip involves the consolidation of the requirement information and other parameters of the plurality of traffic profiles to form a single consolidated traffic profile. The single consolidated traffic profile can then be processed by implementations known to one in the art for generating the NoC interconnect.

In an example implementation, bandwidth requirement for each flow of the consolidated traffic profile can be determined based on a sum of bandwidth requirements within corresponding flows of each subset. From the determined bandwidth requirement, example implementations can further perform link sizing and virtual channel allocation, and further determination of NoC topology, and routes and number of NoC layers. For example, for a given flow $F_x$ of a consolidated traffic profile, topology design process can process each subset from the subset information. If a subset contains two or more traffic profiles that share bandwidth for the same flow $F_x$ with bandwidth requirements (e.g., b1 and b2 for a two traffic profiles example), the sum of the bandwidth requirements (e.g. b1+b2 for the two traffic profiles example) of the traffic profiles within the subset are used for the flow $F_x$. If a subset only contains one traffic profile that utilizes the flow $F_x$, the sum of the bandwidth requirements may be the bandwidth requirement of the one traffic profile. After all subsets are processed, maximum from the sums of the bandwidth requirements can be utilized as the bandwidth requirement for the flow $F_x$. Other implementations are possible and the present application is not limited to this example implementation. For example, sum of all bandwidths for flow $F_x$ across all subsets can also be utilized instead of maximum available bandwidth, depending on desired implementation.

In an example implementation, latency requirement for each flow of the consolidated traffic profile can be determined based on a minimum latency requirement for the flow from all of the subsets. For example, for a given flow $F_x$ of the consolidated traffic profile, topology design process can process each subset. If a subset contains two or more traffic profiles that share bandwidth for same flow $F_x$ with latency requirements (e.g., L1 and L2 for a two traffic profiles example), minimum of the latency requirements of the subset (e.g., min (L1, L2) for the two traffic profiles example) can be considered for the flow $F_x$. If a subset only contains one traffic profile that utilizes the flow $F_x$, latency requirement of the concerned traffic profile can be considered. After all subsets are processed, minimum of the processed latency requirements can be utilized as the latency requirement for the flow $F_x$. Any other implementation is also covered within the scope of the present disclosure and the present application is not limited to this example implementation. For example, only the subsets containing multiple co-existing traffic profiles can be considered to reduce processing, depending on the desired implementation.

In an example implementation, QoS requirements for each flow of the consolidated traffic profile can be determined based on consolidation of QoS requirements for flows from all of the subsets. For example, for a given flow $F_x$ of the consolidated traffic profile, topology design process can process each subset. If a subset contains two or more traffic profiles that shares bandwidth for the same flow $F_x$ with QoS requirements (e.g., QoS1 and QoS2 for a two traffic profiles example), all QoS requirements of the subset (e.g., incorporating both QoS1 and QoS2 for the two traffic profiles example) can be considered for the flow $F_x$. If a subset only contains one traffic profile that utilizes flow $F_x$, QoS requirement of the one traffic profile can be considered. After all subsets are processed, consolidated QoS information can be utilized for each flow. Other implementations are possible and the present application is not limited to this example implementation. For example, only the subsets containing multiple co-existing traffic profiles can be considered for reducing processing, depending on the desired implementation.

In example implementations, generated NoC can be configured to implement and transition between different traffic profiles as well as execute multiple traffic profiles within the same time window. Various traffic profiles can include clock frequency requirements of SoC agents, and power domain and power sequence requirements of the SoC agents, which can be used in configuring the NoC. NoC can thereby facilitate multiple clock and power domains as needed, as described in U.S. patent application Ser. No. 13/922,053, the contents of which is herein incorporated by reference for all purposes in its entirety.

Figure 7:
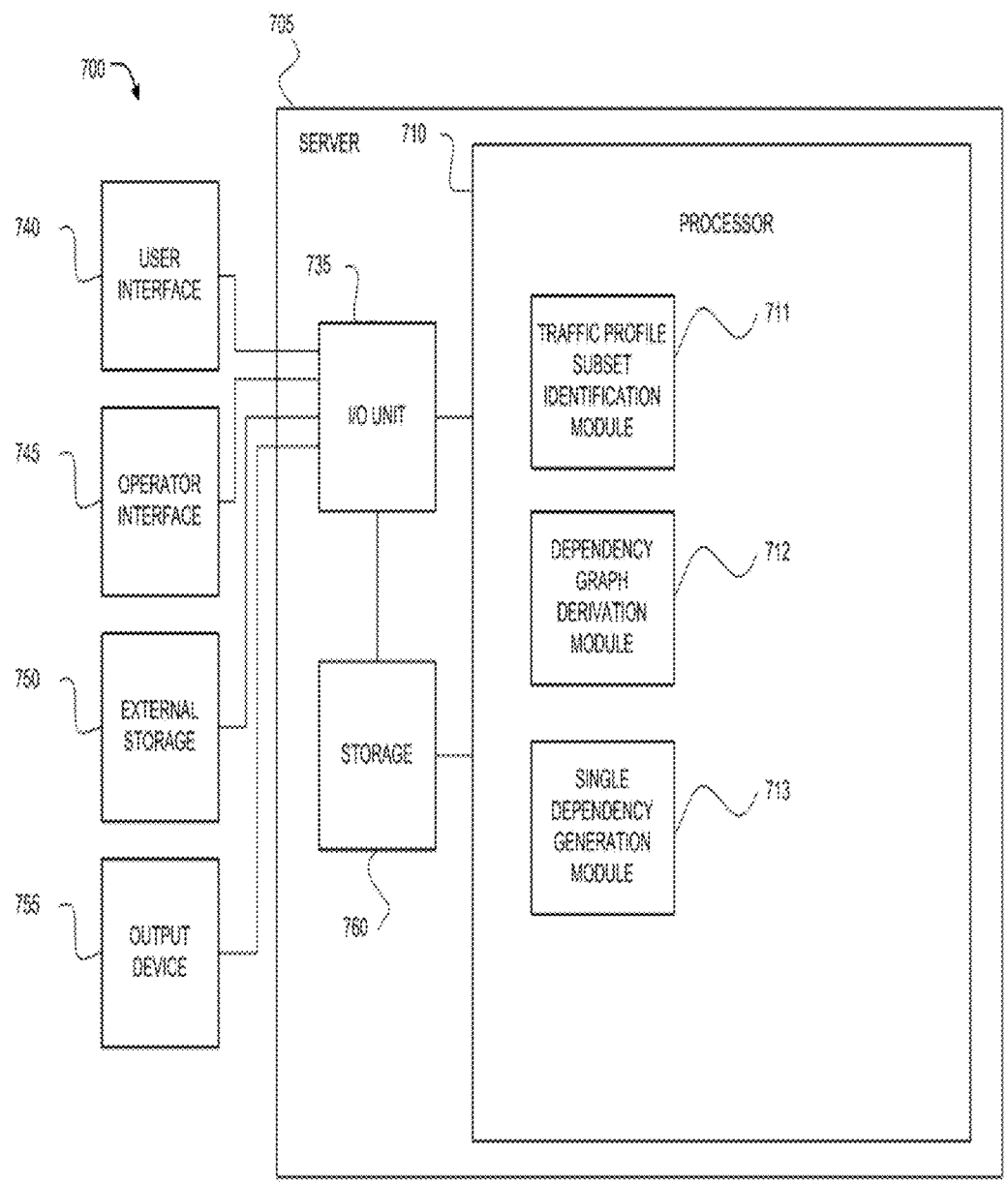
FIG. 7 illustrates a computer/server block diagram upon which the example implementations described herein may be implemented.

FIG. 7 illustrates an example computer system 700 on which example implementations may be implemented. Computer system 700 includes a server 705, which may involve an I/O unit 735, storage 760, and a processor 710 operable to execute one or more units as known to one of skill in the art. The term "computer-readable medium" as used herein refers to any medium that participates in providing instructions to processor 710 for execution, which may come in the form of computer readable storage mediums, such as, but not limited to optical disks, magnetic disks, read-only memories, random access memories, solid state devices and drives, or any other types of tangible media suitable for storing electronic information, or computer readable signal mediums, which can include media such as carrier waves. The I/O unit processes input from user interfaces 740 and operator interfaces 745 which may utilize input devices such as a keyboard, mouse, touch device, or verbal command.

The server 705 may also be connected to an external storage 750, which can contain removable storage such as a portable hard drive, optical media (CD or DVD), disk media or any other medium from which a computer can read executable code. The server may also be connected an output device 755, such as a display to output data and other information to a user, as well as request additional information from a user. The connections from the server 705 to the user interface 740, the operator interface 745, the external storage 750, and the output device 755 may via wireless protocols, such as the 802.11 standards, Bluetooth® or cellular protocols, or via physical transmission media, such as cables or fiber optics. The output device 755 may therefore further act as an input device for interacting with a user.

The processor 710 may execute one or more modules including a traffic profile subset identification module 711 configured to identify subsets of traffic profiles such that each subset of traffic profiles co-exist with other subsets of traffic profiles. In one aspect of the application, each subset can include one or more traffic profiles such that the traffic profile(s) across different subsets can co-exist in any given time window and therefore can be executed together. Such traffic profiles, in an example embodiment, can be derived from subset information of the specification that provides an indication of the subsets of traffic profiles, or can be derived by other methods depending on desired implementation.

In another aspect, processor 710 can further execute a dependency graph derivation module 712 configured to process a given subset having one or more traffic profiles received from module 711 and generate a dependency graph for the respective subset such that dependent edges of traffic profiles for any given or a combination of subsets are added to form a single dependency graph for the given subset of traffic profile(s). Dependency graph derivation module 712 can further be configured to iterate the process of dependency graph generation until all subsets are processed so as to yield a plurality of dependency graph based on the number of subsets.

In another aspect, processor 710 can further be configured to execute a single dependency graph generation module 713 that is configured to form a single dependency graph from all of the processed subsets and their respective dependency graphs. Such a single dependency graph for all subsets can then be analyzed for network and protocol level deadlocks.

In some example implementations, the computer system 700 can be implemented in a computing environment such as a cloud. Such a computing environment can include the computer system 700 being implemented as or communicatively connected to one or more other devices by a network and also connected to one or more storage devices. Such devices can include movable user equipment (UE) (e.g., smartphones, devices in vehicles and other machines, devices carried by humans and animals, and the like), mobile devices (e.g., tablets, notebooks, laptops, personal computers, portable televisions, radios, and the like), and devices designed for stationary use (e.g., desktop computers, other computers, information kiosks, televisions with one or more processors embedded therein and/or coupled thereto, radios, and the like).

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method, comprising:
generating a network on chip (NoC) from a specification, the specification comprising a plurality of traffic profiles and requirement information for each of the plurality of traffic profiles, wherein the NoC is configured to satisfy one or more requirements indicated in the requirement information of the each of the plurality of traffic profiles in the specification;
wherein the requirement information for each of the plurality of traffic profiles comprises at least one of: a bandwidth requirement, a latency requirement, and a Quality of Service (QoS) requirement, protocol and dependency requirements between various messages, clock frequency requirements of System on Chip (SoC) agents, and power domain and power sequence requirements of the SoC agents;
wherein the specification comprises subset information indicative of one or more subsets of the plurality of traffic profiles that can co-exist during a same time window;
wherein the generating the NoC from the specification is performed automatically based on a dependency graph from a deadlock avoidance process and a consolidation of the plurality of traffic profiles from a topology design process.

2. The method of claim 1, wherein the specification comprises clock frequency information and power domain information for each of the plurality of traffic profiles.

3. The method of claim 1, wherein the deadlock avoidance process comprises creating the dependency graph from the plurality of traffic profiles and determining dependencies within one or more subsets of the plurality of traffic profiles that can co-exist during a same time window.

4. The method of claim 1, wherein the topology design process comprises generating a single traffic profile from the plurality of traffic profiles.

5. The method of claim 4, wherein the topology design process further comprises:
determining a bandwidth requirement for each flow of the single traffic profile based on a sum of bandwidth requirements of flows in a subset of the traffic profiles that co-exist during a same time window; and
performing link sizing, virtual channel allocation, and determination of NoC topology, and routes and number of NoC layers, for the single traffic profile based on the determined bandwidth requirement for the each flow of the traffic profile.

6. The method of claim 4, wherein the topology design process further comprises:
determining a latency requirement for each flow of the single traffic profile based on a minimum latency requirement of flows in a subset of the traffic profiles that co-exist during a same time window; and
consolidating Quality of Service (QoS) requirements for the each flow for the single traffic profile from the flows.

7. A non-transitory computer readable storage medium storing instructions for executing a process, the instructions comprising:
Generating a network on chip (NoC) from a specification, the specification comprising a plurality of traffic profiles and requirement information for each of the plurality of traffic profiles, wherein the NoC is configured to satisfy one or more requirements indicated in the requirement information of the each of the plurality of traffic profiles in the specification;
wherein the requirement information for each of the plurality of traffic profiles comprises at least on of: a bandwidth requirement, a latency requirement, and a Quality of Service (QoS) requirement, protocol and dependency requirements between various messages, clock frequency requirements of System on Chip (SoC) agents, and power domain and power sequence requirements of the SoC agents;
wherein the specification comprises subset information indicative of one or more subsets of the plurality of traffic profiles that can co-exist during a same time window;
wherein the generating the NoC from the specification is performed automatically based on a dependency graph from a deadlock avoidance process and a consolidation of the plurality of traffic profiles from a topology design process.

8. The non-transitory computer readable storage medium of claim 7, wherein the specification comprises clock frequency information and power domain information for each of the plurality of traffic profiles.

9. The non-transitory of computer readable storage medium of claim 7, wherein the deadlock avoidance process comprises creating the dependency graph from the plurality of traffic profiles and determining dependencies within one or more subsets of the plurality of traffic profiles that can co-exist during a same time window.

10. The non-transitory computer readable storage medium of claim 7, wherein the topology design process comprises generating a single traffic profile from the plurality of traffic profiles.

11. The non-transitory computer readable storage medium of claim 10, wherein the topology design process further comprises:
determining a bandwidth requirement for each flow of the single traffic profile based on a sum of bandwidth requirements of flows in a subset of the traffic profiles that co-exist during a same time window; and
performing link sizing, virtual channel allocation, and determination of NoC topology, and routes and number of NoC layers, for the single traffic profile based on the determined bandwidth requirement for the each flow of the traffic profile.

12. The non-transitory computer readable storage medium of claim 10, wherein the topology design process further comprises:
determining a latency requirement for each flow of the single traffic profile based on a minimum latency requirement of flows in a subset of the traffic profiles that co-exist during a same time window; and
consolidating Quality of Service (QoS) requirements for the each channel for the single traffic profile from the plurality of traffic profiles of the each channel.

* * * * *